United States Patent [19]

Preiser et al.

[11] 4,420,533

[45] Dec. 13, 1983

[54] METHOD AND APPARATUS FOR COATING SUBMERGED PORTIONS OF FLOATING STRUCTURES

[76] Inventors: Herman S. Preiser, 2 Revell Rd., Severna Park, Md. 21146; Arthur Ticker, 12117 Maddox La., Bowie, Md. 20715; Kenneth J. Hatley, 38 Lawrence Rd., Madison, N.J. 07940

[21] Appl. No.: 314,330

[22] Filed: Oct. 23, 1981

Related U.S. Application Data

[62] Division of Ser. No. 131,312, Mar. 18, 1980, Pat. No. 4,321,101.

[51] Int. Cl.[3] .......... C09J 7/02

[52] U.S. Cl. .......... 428/351; 428/40; 428/352; 428/354; 428/343; 428/423.1; 428/500; 428/353; 428/321.5; 427/208

[58] Field of Search .......... 428/343, 349, 352, 354, 428/351, 353, 423.1, 500, 688, 907, 384, 383; 156/254, 344, 313, 289, 230; 427/208

[56] References Cited

U.S. PATENT DOCUMENTS 3,640,791 2/1972 Rosenheim .......... 156/230
3,761,334 9/1973 Zondek .......... 156/233
4,182,789 1/1980 Castelluzzo .......... 428/40
4,321,101 3/1982 Preiser et al. .......... 156/239

*Primary Examiner*—George F. Lesmes
*Assistant Examiner*—E. Rollins Buffalow
*Attorney, Agent, or Firm*—R. F. Beers; L. A. Marsh

[57] ABSTRACT

A coating for ship hulls is designed for application to areas of the hull not accessible when ship is in dry dock. The means for applying the coating may take several forms: (1) a multilayered tape system having impregnated in or carrying a water soluble intermediate layer antifoulant; (2) a sponge like layer containing impregnated antifoulant paint or coating liquid which can be squeezed therefrom onto the hull; (3) a sponge having mixed therein microspheres of resin and pigment and microspheres of activator material such that when the microspheres are crushed, the pigmented resin, which may also contain an antifoulant, and the activator are mixed and cured to form a coating on the hull. The preferred means and method for applying the coating, is to mount the tape system on the dock blocks in a dry dock before the dry dock is flooded to admit the ship, and then activate the coating by settling the ship onto the blocks as the water is withdrawn from the dry dock. The coating may be applied by hand to small areas of damaged coating of the ship hull.

4 Claims, 5 Drawing Figures

METHOD AND APPARATUS FOR COATING SUBMERGED PORTIONS OF FLOATING STRUCTURES

The invention described herein may be manufactured and used by or for the Government of the Unites States of America for any governmental purposes without the payment of any royalties thereon or therefor.

CROSS-REFERENCE

This is a divisional of Ser. No. 131,312 filed Mar. 18, 1980, now U.S. Pat. No. 4,321,101.

SUMMARY OF THE INVENTION

The invention compomises a method and apparatus for coating those portions of the ship hull which are normally rendered inaccessible by the docking blocks on which the ship rests when in dry dock. The apparatus consists of a multilayered tape system for attachment to the docking block which system includes a tape layer to be adhesively applied to the hull to form a coating thereon, as the ship settles onto the docking blocks. This hull tape is designed to adhere the ship hull in the presence of water. The hull tape may have incorporated in it an antifouling material, such as an organotin compound, or the antifouling material may be in the form of a coating film applied on the hull tape. The supporting tape, which remains attached to the docking block, and the hull tape have between them a material to provide lubricity during movement between the tape layers while the ship is positioning itself on the docking blocks and to promote ease of separation of the two tape layers upon undocking of the ship.

It is an object of this invention to provide a method of coating areas of a ship hull normally made inaccessible by the docking block when the ship is in dry dock.

A second objective is to provide a means to coat selected surfaces of a ship hull when said ship is in dry dock.

A third objective is to provide a means for effecting repairs to damaged hull coatings on water borne vessels.

DESCRIPTION OF THE PREFERRED EMBODIMENT

Figure 1:
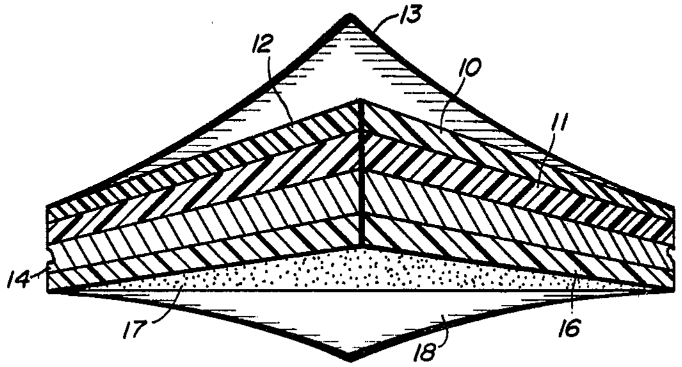
FIG. 1 is a perspective sectional view of the multilayered structure.

The subject invention describes a method and means for the insitu application of, smooth, high quality, long lasting anticorrosive/antifouling protective coating systems to inaccessible obstructed areas of the ship hull while it is resting on docking blocks in dry dock. The preferred embodiment of this invention is shown in FIG. 1 and is described in detail below. Many variations suggest themselves in the method and means of applying such protective coatings to the hull areas under the docking blocks as will be obvious from the teachings of this invention.

As shown in FIG. 1, the means for applying the coating is a pre-assembled multilayered sandwich 9 consisting of a hull tape 10, a block or supporting tape 16, with a layer of soap 14 between them. Exposed adhesive surfaces on the backsides of both the hull tape 10 and the supporting or block tape 16 are protected with an easy release silicone backing paper 13. The hull tape 10 is a special plastic faced tape, as for example, vinyl, 8 to 10 mils thick, containing suitable corrosion inhibiting pigments, such as zinc chromate, red lead, etc. The back surface of this tape 10, is fabricated with a water displacing adhesive 12 which adheres well on non-wetting surfaces such as rubber, plastics and waxes, even when submerged. The plastic facing on the hull tape 10 may leave an antifouling material, such as an organotin compound, incorporated in it, or it may be coated with an antifouling paint 11. A modified version of a commercially available tape identified as 3M Varistrate Sealant Tape (vinyl) SJ8051X, with an oil modified synthetic elastomer (rubber) adhesive 12, may be used as the hull tape 10. The supporting or block tape 16 is a common commercial variety composed of a smooth surfaced plastic material such as polyethylene, polyester or polyurethane to which an appropriate adhesive 17 backing is applied. This adhesive 17 may be the same adhesive 12 used on the hull tape 10, or alternatively, it may be a water soluble adhesive designed to permit easy removal of the expanded block or supporting tape 16 after use. A typical adhesive for this purpose comprises an acrylate copolymer modified with a resin such as polyvinyl alcohol or acetate and a plasticizer. A suggested tape for use as the block tape 16 is identified as 3M Varistrate Sealant Tape SJ8055X with an acrylic based adhesive 17.

Figure 2:
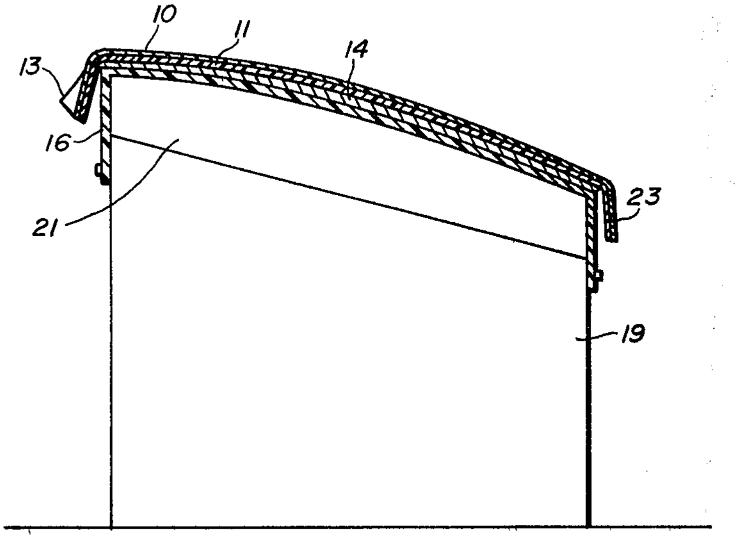
FIG. 2 is a diagrammatic drawing of the multilayered system applied to a docking block.
Figure 3:
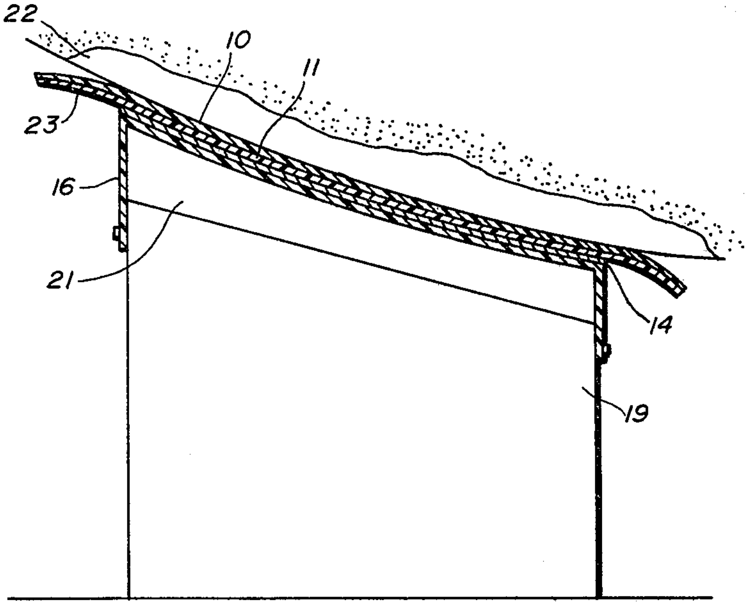
FIG. 3 is a diagrammatic view showing the multilayered system positioned between the ship hull and the docking block.

Referring to FIGS. 2 and 3, prior to dry docking the ship, the hull areas 22 to be obscured by the docking blocks with generous extension on all sides are cleaned of fouling and corrosion by divers using appropriate underwater brushing and jetting tools. The prepared surfaces are then buffed under water with a common water displacing wax, such as paste wax used on floors, cars, and furniture, to render the surface hydrophobic. There are some underwater adhesive primers such as Scotts Tape Primer, manufactured by Minnesota Mining and Manufacturing Co., that can be applied directly to a wetted prepared hull surface, therefore in certain cases the waxing step can be omitted. The docking blocks 19 within the dry dock are properly arranged to cradle and support the ship during dry docking. Each docking block 19 is fitted with a suitable rubber pad 21 on the hull supporting surface which acts as a compression surface over the bearing area of the block 19 to provide a conforming cushion. The cushion should have sufficient resilience and strength to permit minor lateral movement and compression deformation to insure that the tape sandwich 9 is properly positioned and compressed against the hull 22 despite irregularities of surface contour. The use of a cambered or domed pad 21 to permit point contact of the hull 22 against the tape sandwich 9 is desirable to reduce the possibility of air and water entrapment between the contact surfaces of the hull 22 and the hull tape 10. It is also feasible to incorporate into the pad 21 structure, variable mechanical or material stiffness in such a manner as to cause controlled lateral movement during compression which will stretch the tape system 9 for additional smoothness during final positioning when the ship comes to rest on the docking blocks 19.

The tape system 9, which is pre-assembled with a conventional silicone release backing paper 13 on each of the exposed adhesive surfaces 12, 17 is brought into the dry dock and cut to size to fit over the bearing surface of each docking block 19 hull contacting area, allowing sufficient area of the tape sandwich 9 to extend beyond the confines of the blocks' hull contacting area to form tabs 23. This overlap will permit subsequent positioning, feathering, alignment and blending of the hull tape 10 to the remainder of the refurbished hull 22 to be accomplished during overhaul of the ship in the dry dock.

Figure 4:
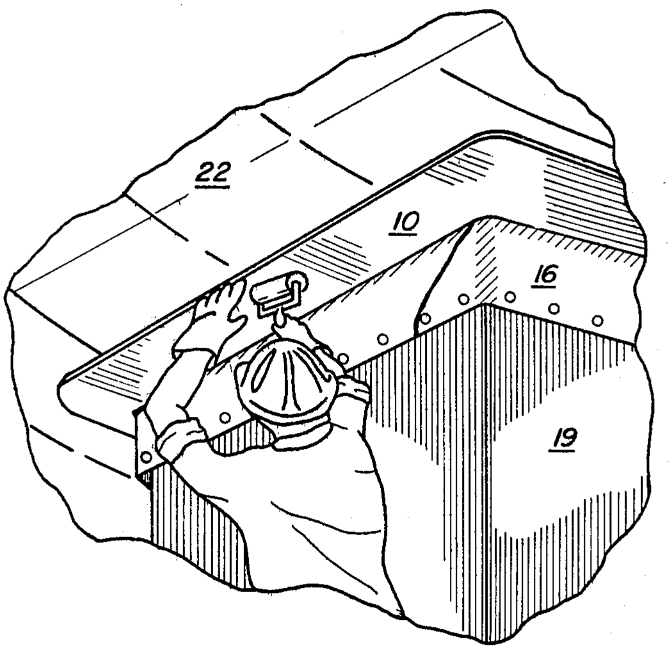
FIG. 4 is an illustration of fairing the tape tab to the hull by hand.
Figure 5:
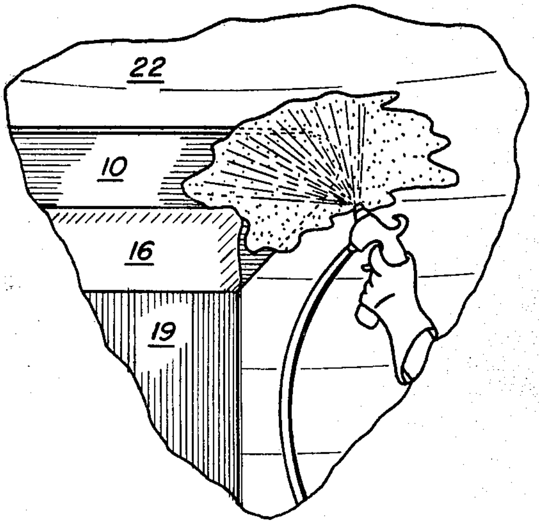
FIG. 5 is an illustration of applying the final coating to the tabs.

The prepared tape system 9 has the protective paper 13 stripped from the bottom adhesive of the supporting or block tape 16 and the sandwich 9 is then positioned on the rubber pad 21 smoothing and securing it to the pad 21 surface by applying palm pressure or by other suitable means. The overlapping portions of the block tape 16 are then secured to the docking blocks 19 by suitable means to prevent movement of the supporting tape layers. Once all rubber pads 21 in the dry dock are covered with the tape assembly 9, the upper adhesive surface 12 has the protective paper 13 stripped off. The dry dock is then flooded in the usual manner, the ship is floated into proper docking position alignment and lowered onto the blocks 19 by controlled pumping out of the water from the dry dock. During final positioning and cradling of the ship on the blocks 19, the pressure of the hull 22 on the blocks 19 will cause the exposed adhesive 12 of the hull tape 10 to adhere to the hull 22. Minor sliding movement between the hull tape 10 and the block tape 16, during final positioning maneuvers, will be permitted by the water soluble soap paste layer 14 which holds the two tapes 10 and 16 together. In some cases the prepared surface areas on the ship bottom are further treated with water displacing special primers to facilitate adhesion of the block or supporting tape 16 to wood, porous surfaces or nonferrous metals. The vinyl surface of the hull tape 10 prior to assembly into the sandwich 9 may be pretreated with a standard copper oxide or other antifoulant paint 11, to a dry film thickness of approximately 6 mils. These tapes may be made of other suitable plastics, such as polyurethane. In some cases a mist coat of vinyl primer is used on the tape prior to application of antifouling topcoats. Also, antifoulants in the form of organometallic compounds or polymers can be incorporated into the chemical structure of the hull tape film 10 in lieu of top coating with antifouling paint systems 11. After the hull tape 10 has been prepared and cured, the two tape systems 16 and 10 are sandwiched together face to face with the water soluble paste soap 14 between them. Additives such as polyvinyl alcohols can be used in such soaps to facilitate rapid dissipation from the antifouling surface once the ship is waterborne with the tape system 10 in place. This soap layer 14 performs the function of holding the block tape 16 and hull tape 10 in proper alignment and allows for minor movement (sliding motion) between the two tapes 10 and 16 as may be required when the ship hull 22 positions itself on the docking block 19 during the final stages of dry docking. The lubricating paste soap 14 should be of relatively high viscosity, and must not contain solvents incompatible with the hull tape's paint system. The soap 14 should be soluble in fresh, brackish and seawater or be easily washed off the surface of the hull tape 10 by water movement about the hull 22. Once the tape system 9 is in place and sandwiched between the docking block 19 and the ship hull 22 fairing and final trimming of the tape patches are made in dry dock after pumping the water out of the dry dock. The hull tape overlaps the docking blocks to form tabs 23. The soap layer 14 is washed off the surface of the hull tape tabs 23. The hull tape overlapping adhesive surface is masked with protective paper similar to paper 13. Then, as shown in FIGS. 4 and 5, the hull areas 22 adjacent to the docking blocks 19 are carefully cleaned and painted with the standard anticorrosive paint system used for the hull 22. After the paint drys, the protective paper 13 is removed from the tabs 23 of the hull tape 10 and these tabs of the tape 10 are adhered to the hull surface using hand squeegees and rollers. After the hull tape 10 is in place and allowed to cure for several hours, any rough edges of the adhered tabs 23 are ground off with a fine abrasive sander. The tape 10 and the adjacent hull surface are then finish coated with the standard compatible antifouling 11 topcoats.

When the ship is ready for undocking, the ship is refloated off the docking blocks 19 and its upward motion will separate the adhered working tape 10 from the carrier tape 16 through the soluble soap layer 14. After the ship is returned to service, the residual water soluble soap layer 14 remaining on the working antifouling paint surface 11 will dissolve and/or wash away, and the working tape surface 10 will now perform as an integrated component of the underwater hull paint system. In subsequent dry dockings, the expended working tape system can be removed by divers with stiff wire brushes and the process repeated again without the need for extensive underwater surface preparation. Also, the tape system 9 can be applied directly over an expended tape system.

Alternative procedures include:

a. Microsphere Encapsulation. According to this procedure, an anticorrosive (AC) two component paint system, such as Navy Formula 150, is encapsulated in thin walled glass or plastic microspheres, with each component contained in separate spheres. These spheres are then uniformly distributed in a compressible open cell sponge matrix (urethane, rubber or any other suitable material) while maintaining the proper mixing ratio between spheres containing the resin and spheres containing the activator. In the case of a single component AC system, this would not be necessary since all the spheres would contain the single component. The sponge matrix, containing the microspheres, is mounted with suitable adhesives, to a semi-flexible (to conform to the hull curvature) plastic sheet, such as glass reinforced plastic (GRP). The other side of the plastic sheet is spray coated with a suitable antifouling (AF) coating, such as Navy Formula 121, and allowed to cure or the GRP can be made of organometallic resins containing AF toxicants. The entire item described above is prefabricated and ready for application to the supporting surfaces of the docking blocks by means of a double-faced tape which features a water soluble adhesive on the surface contacting the units AF coatings. After the variation of the instant invention, as described herein, is applied to all the prepositioned rubber-faced docking blocks, the ship is dry docked in the usual manner. As the ship hull comes to rest on the docking blocks, the sponge matrix is compressed by the ship's weight and the microspheres are ruptured and crushed, causing the encapsulated paint components to squirt out of the spheres and to intimately mix to initiate the paint curing process. After the hull surface has been prepared for painting, the portion of the unit overlapping the docking blocks is faired into the adjacent hull area so that when the hull is painted, the newly applied paint system overlaps the edges of the unit. When the ship is undocked and returned to duty, the unit adheres to the hull, separating from the docking blocks at the tape interface and functioning as an integral part of the hull coating system. Residual tape adhesive on the AF paint surface will soon dissolve into the water.

b. Paint Impregnated Sponge. This method is a further variation of (a) above in that the microspheres are replaced with a single component AC paint system in the form of a paste, which would be impregnated into the sponge. The remainder of the unit would be and function as described above.

c. Ruptured Cushion. In a further variation of the present procedures a plastic cushion, consisting of a vinyl or polyvinyl chloride (PVC) casing (or other suitable material) approximately 15 mils thick, filled with a suitable anticorrosive paint. The top surface of the cushion casing features a uniform distribution of perforations, each thinly covered with a PVC film approximately 1 or 2 mils thick (weak spots). The bottom surface of the cushion is spray coated with a suitable AF coating, such as Navy Formula 121, and allowed to cure. This prefabricated package is applied to the padded bearing surfaces of the dry dock blocks by means of a double-faced tape which features a water soluble adhesive on the surface contacting the cushion's AF paint. The ship is then dry docked in the usual manner. As the hull settles to rest on the rubber padded docking blocks, the weight of the ship crushes the cushion, applying pressure to the liquid AC paint within the cushion, and finally rupturing the cushion casing at the provided weak spots permitting the paint to squirt out against the ship hull. The compressed cushion casing overlaps the docking block and when dry is faired into the adjacent coating system and overpainted. During the undocking operation, the cushion separates from the docking block at the tape interface, and commences to function as an integral part of the coating system.

d. Spray on Film Method. Another variation of the present procedure consists of using a rubber pad covering the bearing surface of the docking block. The rubber pad is then covered with a Mylar adhesive tape allowing sufficient overlap to tack the tape to the docking block sides. A lubricating paste soap is liberally applied to the Mylar surface which is then covered by a thin soluble sheet of polyvinyl alcohol or acetate. The polyvinyl alcohol surface is then spray coated with a suitable antifouling paint, such as a modified Navy Formula 150 (epoxy) or Navy Formula 121 (vinyl). If the epoxy AF paint is used, and a vinyl hull tape is to be applied to the hull, then it is positioned face down to the antifouling paint while the paint is still wet so that the vinyl surface is immersed in the wet antifouling paint to promote adhesion. If a vinyl AF paint is used, then the vinyl surface of that tape should be positioned face down to said antifouling paint when said paint has dried to a tacky state. When the sprayed coatings are fully cured, the backing paper is removed from the vinyl adhesive tape and the dry dock is flooded. The ship is dry docked in the usual manner and settles onto the prepositioned docking blocks. Coating damage due to minor movement and scraping during docking maneuvering is prevented by the lubricating soap. Overlapped material shown is faired into the adjacent paint system. When the ship is undocked, the vinyl tape adheres to the hull and the package separates at the soap interface. The soap and the polyvinyl alcohol gradually dissolve in the water exposing the antifoulant paint which then functions as an integral part of the ship's total paint system.

e. Underwater Repair of Damaged Hull Coatings. Still another variation of the instant procedure, useful for the underwater repair of hull coatings damaged by debris or scraping, consists of divers cleaning the exposed hull surface and trimming the damaged coatings back to the areas of good coating adhesion, feathering the coating edges around the perimeter of the damaged area, and applying underwater a sheet of hull coating tape sufficient to cover the damaged area. Squeegees or rollers are used by the divers to smooth the tape and to remove entrapped water pockets. "Bear claw" magnets on the ship hull may be used to stabilize the divers so that they can exert pressure in applying and smoothing the hull tape. The tapes edges are feathered and faired into the existing hull coating system and the entire repaired area is overcoated at the next scheduled dry docking.

Obviously many modifications and variations of this invention are possible in light of the above teachings. It is therefore to be understood that within the scope of the appended claims the invention may be practiced otherwise than as specifically described.

What is claimed is:

1. A multilayered tape sandwich structure for use in coating those areas of a ship hull obscured by the docking block when the ship is in dry dock comprising:
- a first tape for attachment to the ship hull;
- an adhesive operable underwater applied to one face of the first tape for adhering said tape to the ship hull;
- a second tape for attachment to the supporting surface of a docking block;
- a water soluble soap means interspersed between said first tape and said second tape to provide ease of separation and to accommodate sliding movement between said tapes; and
- an adhesive means for attaching said second tape to a docking block.

2. A multilayered tape sandwich as claimed in claim 1 which said first tape is made of a vinyl material.

3. A multilayered tape sandwich as claimed in claim 1 in which said first tape is made of polyurethane.

4. A multilayered tape sandwich as claimed in claim 1, further comprising;
- a layer of antifoulant material interposed between the first tape and the means interspersed between the first and second tapes, and the layer of antifoulant material is secured to the first tape.

* * * * *